(12) United States Patent
Maldavs

(10) Patent No.: US 6,675,833 B2
(45) Date of Patent: Jan. 13, 2004

(54) CONNECT UNDER PRESSURE COUPLING

(75) Inventor: Ojars Maldavs, Lincoln, NE (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 10/349,520

(22) Filed: Jan. 22, 2003

(65) Prior Publication Data

US 2003/0145892 A1 Aug. 7, 2003

Related U.S. Application Data

(60) Provisional application No. 60/354,104, filed on Feb. 4, 2002.

(51) Int. Cl.$^7$ .............................................. F16L 37/34
(52) U.S. Cl. ........................ 137/614.05; 137/614.03; 251/149.6
(58) Field of Search ...................... 137/614.03, 614.04, 137/614.05, 614; 251/149.6

(56) References Cited

U.S. PATENT DOCUMENTS

| | | |
|---|---|---|
| 3,076,671 A | 2/1963 | Freeman |
| 3,613,726 A | 10/1971 | Torres |
| 3,781,039 A | 12/1973 | Locke et al. |
| 4,086,939 A | 5/1978 | Wilcox et al. |
| 4,564,042 A | 1/1986 | Ekman |
| 4,949,938 A | 8/1990 | Ekman |
| 5,159,955 A | 11/1992 | Ekman |
| 5,323,812 A | 6/1994 | Wayne |
| 5,806,564 A | 9/1998 | Wilcox |
| 5,937,899 A | 8/1999 | Zeiber |
| 5,967,491 A | 10/1999 | Magnuson |
| 5,996,624 A | 12/1999 | Ekman |
| 6,016,835 A | 1/2000 | Maldavs |
| 6,095,190 A | 8/2000 | Wilcox et al. |
| 6,145,539 A * | 11/2000 | Wilcox et al. ......... 137/614.03 |
| 6,283,151 B1 | 9/2001 | Countryman et al. |

FOREIGN PATENT DOCUMENTS

EP 0 926 423 A 6/1999

OTHER PUBLICATIONS

Copy of International Application No. WO 98/19097 published under the Patent Cooperation Treaty, published May 7, 1998.
Copy of International Application No. WO 00/29776 published under the Patent Cooperation Treaty, published May 25, 2000.
Copy of International Application No. WO 00/61984 published under the Patent Cooperation Treaty, published Oct. 19, 2000.

* cited by examiner

Primary Examiner—Kevin Lee
(74) Attorney, Agent, or Firm—Christopher H. Hunter

(57) ABSTRACT

A quick-connect coupling includes a male half and a female half, where the female half includes a locking mechanism to couple the male half to the female half; and a valve assembly, which when the male half is coupled to the female half, opens a flow path through the coupling. The valve assembly includes an upstream, pressure balanced secondary valve and a downstream primary valve. The secondary valve maintains the downstream portion of the female coupling half at zero pressure, such that the male half can be easily connected. When the male half is removed, the primary and secondary valves of the valve assembly close to prevent fluid flow through the coupling. The female coupling also allows pressure to escape from the downstream end of the female half to atmosphere, should there be leakage around seals in the secondary valve after the female coupling half is disconnected.

38 Claims, 6 Drawing Sheets

CONNECT UNDER PRESSURE COUPLING

CROSS REFERENCE TO RELATED CASES

The present application claims the benefit of the filing date of U.S. Provisional Application Ser. No. 60/354,104; filed Feb. 4, 2002, the disclosure of which is expressly incorporated herein by reference.

FIELD OF THE INVENTION

The present invention relates generally to fluid couplings, particularly for coupling a fluid line from a piece of construction equipment, to an implement.

BACKGROUND OF THE INVENTION

Couplings for connecting fluid lines are well known and include a coupler socket (female half) and a nipple (male half). In some types of couplings, when the male half is inserted into the female half, a valve assembly in the female half opens to provide a flow path through the coupling. At the same time, a catch or coupling mechanism automatically engages the male half to retain the male half within the female half. Typically, the coupling mechanism can be manually released to disconnect the male half from the female half, at which point the valve assembly closes the flow path through the coupling. Such a coupling is conventionally referred to as a "push-to-connect" coupling.

The male half of a coupling typically includes a tubular plug circumscribing a central passage, and a threaded fitting portion at its rear end which enables the male half to be connected to a pipe or tube. A valve assembly may also be provided in the male half. The male half narrows down at its forward end and includes an outwardly-facing circumferential groove or channel. When the male half is inserted into the female half, the coupling mechanism on the female half engages the groove on the male half to retain the male half within the female half.

One particularly useful type of push-to-connect coupling is referred to as a "flush face" coupling. In a flush face coupling, the front of the male half has a complimentary surface with the front of the female half such that certain engaging surfaces of the male and female half are all flush with one another. This flush face assembly is intended to prevent leakage during disconnect, and generally to prevent contaminants entering the coupling during connect and disconnect.

A number of different types of coupler sockets have been developed for receiving a male half. One known type of socket includes a cylindrical body with an internal poppet valve. The poppet valve is spring-biased into a normally closed position when the coupling is disconnected. Internal pressure in the female coupling also urges the poppet valve against its seat to prevent fluid leakage when disconnected. The body of the female half has a series of tapered openings in a circumferential arrangement near the forward end, and a series of locking balls are received in the openings. A spring-biased locking collar is slidably disposed around the coupler body, and when the male valving is inserted into the socket, the locking collar forces the locking balls radially inward into the groove in the male half to lock the male half to the female half. At the same time, the poppet valve in the female half engages with a valve assembly in the male half to open the flow passage through the coupling.

To uncouple the male half from the female half, the locking collar is moved rearwardly, which allows the locking balls to move outwardly from engagement with the groove in the male half, and thereby allow the male half to be removed from the female half. As the male half is removed, the poppet valve in the female half and the valve assembly in the male half are moved to closed positions to prevent fluid flow through the respective halves of the coupling.

Most flush face couplings are designed to connect and disconnect without pressure in the hoses and coupling. In many applications, such as in construction equipment (e.g., loaders), this is not a concern, as the female coupling half is typically connected by hose to an implement. The implement does not have a source of pressure, and so the hose and female coupling half are typically at zero pressure when the implement is disconnected. However, under some operating conditions, such as during the heat of the day, the pressure within the disconnected female coupling half can increase. If the pressure increases to a great enough extent, it can be difficult (or virtually physically impossible) to connect the male half, as the coupling components in the female half resist movement against the pressure.

It is believed some have attempted to solve this problem by using a plurality of concentric, inter-nesting valves, such that pressure upstream in the female coupling half does not prevent the connection with the male half. One such example is shown in U.S. Pat. No. 6,095,190, which includes a spring-biased ball valve (vent valve) which is concentrically located within a poppet valve (main valve). The ball valve is initially opened by an actuator engaged by a sleeve valve for pressure relief prior to the poppet valve being moved from its seat for full flow. While this two-step process may be appropriate for certain applications, it requires complex and numerous valve components, and complicated and time-consuming assembly steps, which increases the costs associated with the valve. It is further believed this design does not take into account (i.e., compensate for) pressure build-up downstream of the poppet valve, for example due to leakage past the ball valve and/or poppet valve, while the female coupling is disconnected.

It is therefore believed there is a demand for a further improved push-to-connect, flush-face coupling which overcomes at least some of the above-described drawbacks.

SUMMARY OF THE PRESENT INVENTION

The present invention provides a new and unique push-to-connect, flush-face coupling, particularly for construction equipment, where the female coupling half has a valve assembly including a primary valve in the downstream portion of the coupling half, and a pressure-balanced secondary valve in the upstream portion of the coupling half. The secondary valve maintains low (preferably zero) pressure in the downstream end to allow easy connect of the male coupling half, even when there is pressure upstream of the secondary valve. The secondary valve of the valve assembly is of relatively simple construction, which facilitates manufacturing and assembly of the coupling, and thereby reduces the costs associated with the coupling. The primary valve also allows pressure to escape from the downstream end, should there be leakage past the secondary valve after the female coupling half is disconnected.

According to the present invention, the secondary valve includes a spring-biased valve sleeve received within a seal gland. The valve sleeve is axially moveable to open a flow path between the gland and the coupling body. The forward end of the valve sleeve normally seals against a seal in the coupling body when the female half is disconnected, and a second seal is retained by the gland and held against the side of the valve sleeve. Fluid pressure upstream of the secondary valve is applied along the length of the valve sleeve (preferably essentially perpendicular to the valve), which balances the valve sleeve and makes it easy to move the secondary valve during the coupling process.

The primary valve in the female coupling half includes an axially-moveable and spring-biased cylindrical face sleeve with an annular flat front face which engages flush against the annular flat front face of the male half, a cylindrical retainer sleeve received within the face sleeve and fixed to the fitting; an axially movable and spring-biased cylindrical sealing sleeve received within the retainer sleeve; and a cylindrical valve body located centrally within the sealing sleeve and also fixed to the fitting. A tubular actuator is also slidably received within the retainer sleeve, and is in engagement with the secondary valve. The actuator can be formed integral with the secondary valve or integral with the sealing sleeve; or can be a separate component.

A locking mechanism is provided with the female coupling half which cooperates with the male half to couple the male half to the female half. When coupled, the primary and secondary valves open a flow path through female half. Preferably, the locking mechanism includes openings for locking balls in the body of the cylindrical fitting, and a spring-biased locking collar which retains the locking balls in engagement with a groove in the male half when the male half is inserted into the female half, and which can be axially moved to release the locking balls and thereby allow the male half to be removed from the female half.

When the male coupling half is inserted into the female half, the valve assembly (if present) in the male half opens, and the male half urges the face sleeve of the female half rearwardly within the coupling body. The face sleeve cooperates with the sealing sleeve to also move the sealing sleeve rearwardly within the coupling body and out of sealing engagement with the valve body. When the male half is further inserted, the sealing sleeve engages the actuator, which opens the secondary valve, to thereby open up a flow path through the coupling. Since the secondary valve is pressure balanced, the secondary valve opens easily and without resistance, even when there is pressure in the female half At the same time, the locking mechanism engages the male half to couple the male half to the female half.

When the male half is to be removed, the sealing sleeve of the primary valve seals back against the valve body, and the secondary valve likewise closes to prevent fluid flow through the female half of the coupling. The valve assembly in the male half likewise returns to a closed position. The flush engagement of the male valving with the face sleeve prevents leakage of fluid during disconnect.

A seal at the forward end of the valve body in the female coupling half normally provides a seal against the sealing sleeve to prevent leakage of fluid from the female half during connect and disconnect. However, if fluid leaks around the secondary valve, for example, due to leakage past the seals of the secondary valve after the male half is disconnected from the female half, and the pressure builds up (due to this or other reasons) to an unacceptable level at the forward end of the female coupling half, the seal of the valve body has a configuration which allows the fluid to escape to atmosphere.

In a further aspect of the invention, an annular flange can be provided integral with the valve sleeve of the secondary valve. The flange fits closely within the coupling body and creates an orifice that restricts flow through the secondary valve until the male coupling half is fully connected. The flange (or other appropriate geometry) prevents sudden surges of fluid through the secondary valve during connection. When the male half is fully connected, the flange moves out of close relation with the coupling body to maximize flow and minimize the pressure drop across the secondary valve.

Thus, as described above, the present invention provides a push-to-connect coupling, particularly for construction equipment, which overcomes many of the drawbacks of previous couplings, and namely, which allows easy connect of the male coupling half, even when the female half is under pressure; and which allows pressure to escape from the downstream end of the female half, should there be leakage through the secondary valve.

Further features of the present invention will become apparent to those skilled in the art upon reviewing the following specification and attached drawings.

BRIEF DESCRIPTION OF THE DRAWINGS

FIG. 1A is an enlarged, cross-sectional side view of a portion of the female coupling half of FIG. 1;

DETAILED DESCRIPTION OF THE PREFERRED EMBODIMENT

Figure 1:
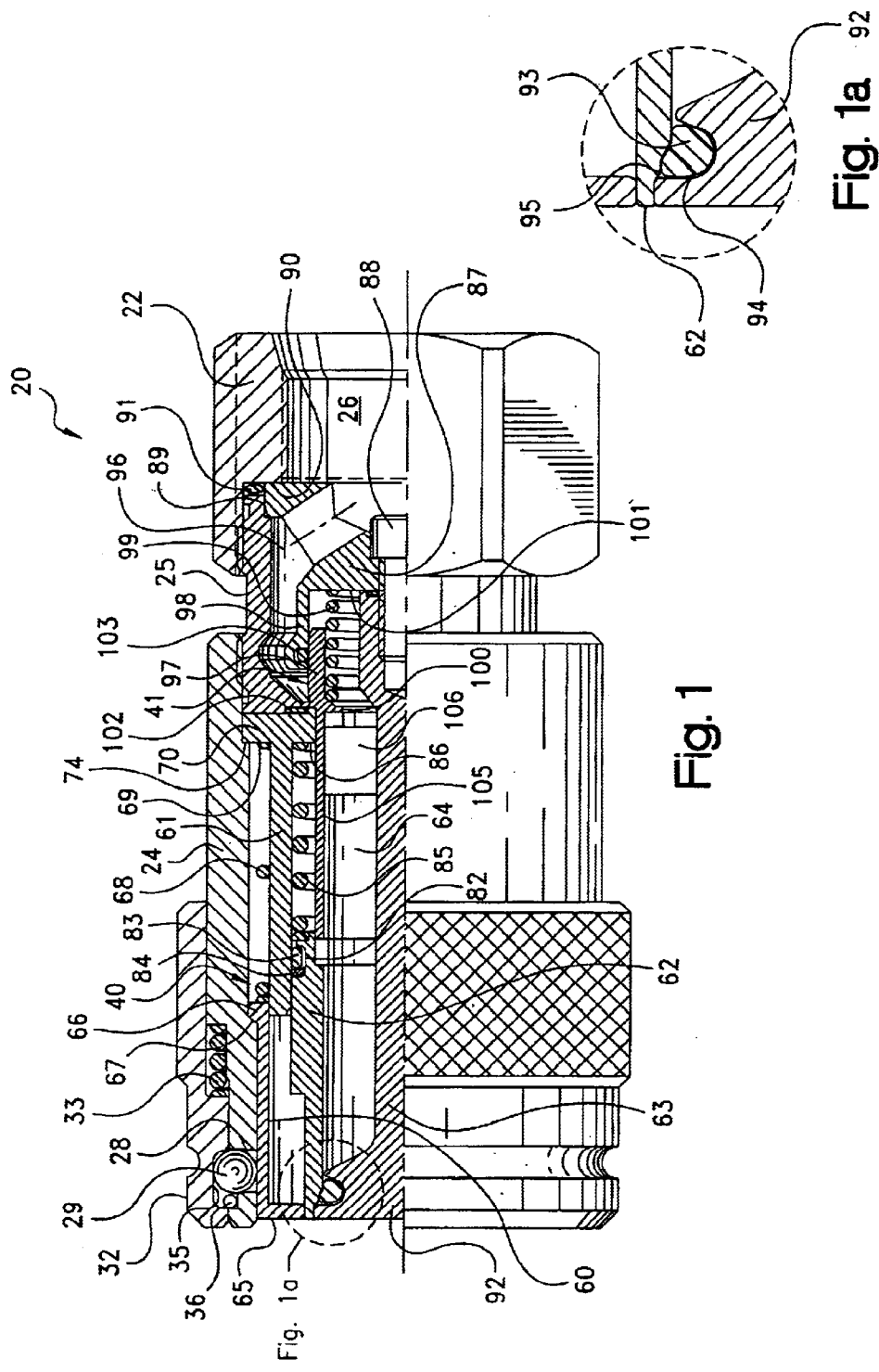
FIG. 1 is a side view, shown in partial cross-section, of the female half of a coupling constructed according to the principles of the present invention.

Referring to the drawings, and initially to FIG. 1, the female half of a coupling constructed according to the principles of the present invention is indicated generally at 20. The coupling is particularly useful for connecting a piece of construction equipment (e.g., a loader) to a remote implement (e.g., a bobcat loader), however, it should be appreciated that the coupling could be used for a variety of applications, for example in agricultural applications, where a tractor is fluidly connected to a farm implement. In any case, the female coupling half includes a fitting 22 and a cylindrical body 24 which are interconnected by a hollow cylindrical adapter 25. The fitting 22 has an outer geometry (e.g., a hexagonal configuration) appropriate for being engaged by a conventional tool; and an inner geometry defining an internal cavity or passage 26. The forward end of the passage 26 is threaded and receives a threaded rear end of adapter 25. The other (rear) end of the passage is likewise preferably threaded and can receive a conventional hose or tube end, or otherwise can be connected as appropriate within the fluid system.

The coupling body 24 likewise has one (rear) end with threads which receive a threaded front end of adapter 25. The other (front) end of the body 24 has a plurality of circular openings 28 evenly spaced around the circumference of the body and tapered in the radially-inward direction to support locking balls 29.

A cylindrical coupling or locking collar 32 is received on the front end of the body 24. The locking collar includes a standard outer, gnarled surface (not shown) for easy grip by the user. A spring 33 is located internally of the collar (between an inner shoulder on the collar 32 and an outer shoulder on the body 24) for urging the locking collar forwardly along the body 24. Locking collar 32 includes an inner circumferential groove or channel 35 which is dimensioned to receive locking balls 29 to retain the locking collar on the body 24 when the coupling is disconnected (as shown in FIG. 1). A retaining ring 36 is provided at the forward end of the channel 35 to retain the locking collar on the body when the female coupling half is connected to a male half (see, e.g., FIG. 4). The locking collar thereby has limited axial movement along the coupling body.

The female coupling half 20 further includes a valve assembly. The valve assembly includes a primary valve assembly, indicated generally at 40, and a secondary valve assembly, indicated generally at 41. The primary valve assembly 40 is located downstream in the coupling body and includes an axially-moveable and spring-biased cylindrical face sleeve 60; a cylindrical retainer sleeve 61 received within the face sleeve and fixed relative to the coupling body; an axially movable and spring-biased cylindrical sealing sleeve 62 received within the retainer sleeve; and a cylindrical valve body 63 located centrally within the sealing sleeve and also fixed relative to the coupling body. A flow passage 64 through the coupling body is defined between the sealing sleeve 62 and the valve body 63.

The cylindrical face sleeve 60 is closely received with coupler body 24, and moves axially with respect thereto. Face sleeve 60 includes an annular, radially-inward directed annular flange 65 at its front end, and a radially-outward directed annular flange 66 at its rear end. Rear flange 66 is designed to engage a radially-inward projecting annular shoulder 67 on coupler body 24 to limit the forward movement of face sleeve 60 with respect to the coupler body. An outer sleeve spring 68 urges the face sleeve 60 forwardly within the body. Spring 68 is disposed between the rear annular end surface of face sleeve 60, which defines a first spring stop, and the forward annular surface of an outer shoulder 69 of the base 70 of retainer sleeve 61, which defines a second spring stop.

Retainer sleeve 61 is closely received within face sleeve 60, with annular base 70 fixedly held between an inner shoulder 74 on the coupling body 24 and the forward end of adapter 25.

The cylindrical sealing sleeve 62 is closely received within retainer sleeve 61, and has an annular, outwardly-facing groove 82 at its rear end which receives an O-ring gasket 83. Gasket 83 provides a fluid-tight seal between sealing sleeve 62 and retainer sleeve 61. A back-up washer 84 is also preferably provided in groove 82 forwardly of gasket 83 to add strength and rigidity to the gasket. An inner sleeve spring 85 urges sealing sleeve 62 forwardly within fitting 22, and is disposed against the rear annular end surface of sealing sleeve 62 defining a first spring stop, and the forward annular surface of an inner shoulder 86 of the base 70 of retainer sleeve 61, defining a second spring stop.

Finally, valve body 63 is centrally received within coupling body 24 and fixed to a seal gland 87 via a threaded nut 88. Seal gland 87 is itself fixed between an inwardly-directed annular shoulder 89 on adapter 25 and an inwardly-directed annular shoulder 90 on fitting 22, such that the valve body 63 is likewise fixed with respect to coupling body 24. An annular seal or gasket 91 is provided between the rear end of adapter 25, the forward end surface of shoulder 90 of fitting 22, and seal gland 87, to prevent fluid leakage between these components.

Valve body 63 includes an enlarged forward valve head 92 with a flat front face, and an annular gasket 93 (see FIG. 1A) is provided in a groove 94 in the side of the valve head 92 to provide a fluid-tight seal with sealing sleeve 62. Sealing sleeve 62 has a stepped inner surface 95, in opposing relation to seal 93, the reason for which will be described below. When the female half is uncoupled, the inner sleeve spring 86 urges sealing sleeve 62 against central valve body 63 to prevent fluid draining from the female coupling half.

A flow passage 96 is provided between the gland 87 and the adapter 25. Passage 96 interconnects passage 26 in fitting 22 with flow passage 64 in coupling body 24. the secondary valve assembly 41 in the upstream end of the coupling body controls the flow of fluid through passage 96, and includes a tubular valve sleeve 97 which is axially moveable and closely received within a tubular extension 98 of the seal gland 87. A spring 99 biases the valve sleeve 97 forwardly within the coupling body. The valve sleeve 97 includes a radially-inward directed annular forward flange 100, which serves as a forward spring stop for spring 99, while a forwardly-facing annular end wall 101 of gland 87 serves as the opposite spring stop. A first annular seal 102 is supported within a groove defined between the base 70 of retainer sleeve 61 and the forward end of adapter 25, although as will be describe below, seal 102 could likewise be carried by the forward end of the valve sleeve. A second annular seal 103 is carried within a radially inward facing groove in the tubular extension 98 of gland 87, and provides a seal against the length of valve sleeve 97 to prevent fluid bypass as valve sleeve moves between the open and closed positions. Valve sleeve 97 is normally urged forwardly into sealing relation with seal 102 to close the flow path through passage 96.

As can be appreciated from FIG. 1, the flow passage 96 has a configuration such that fluid pressure is applied substantially perpendicular to the axis of the valve sleeve when the sleeve is in the closed and sealed position. The seals 102 and 103 also seal at preferably about the same diameter on the valve sleeve 97. Thus, the pressure applied to the valve sleeve is essentially just the spring force of spring 99, and upstream fluid pressure does not significantly effect the movement of the secondary valve. Such a valve can be considered "balanced", i.e., essentially unaffected by pressure within the system.

Figure 5:
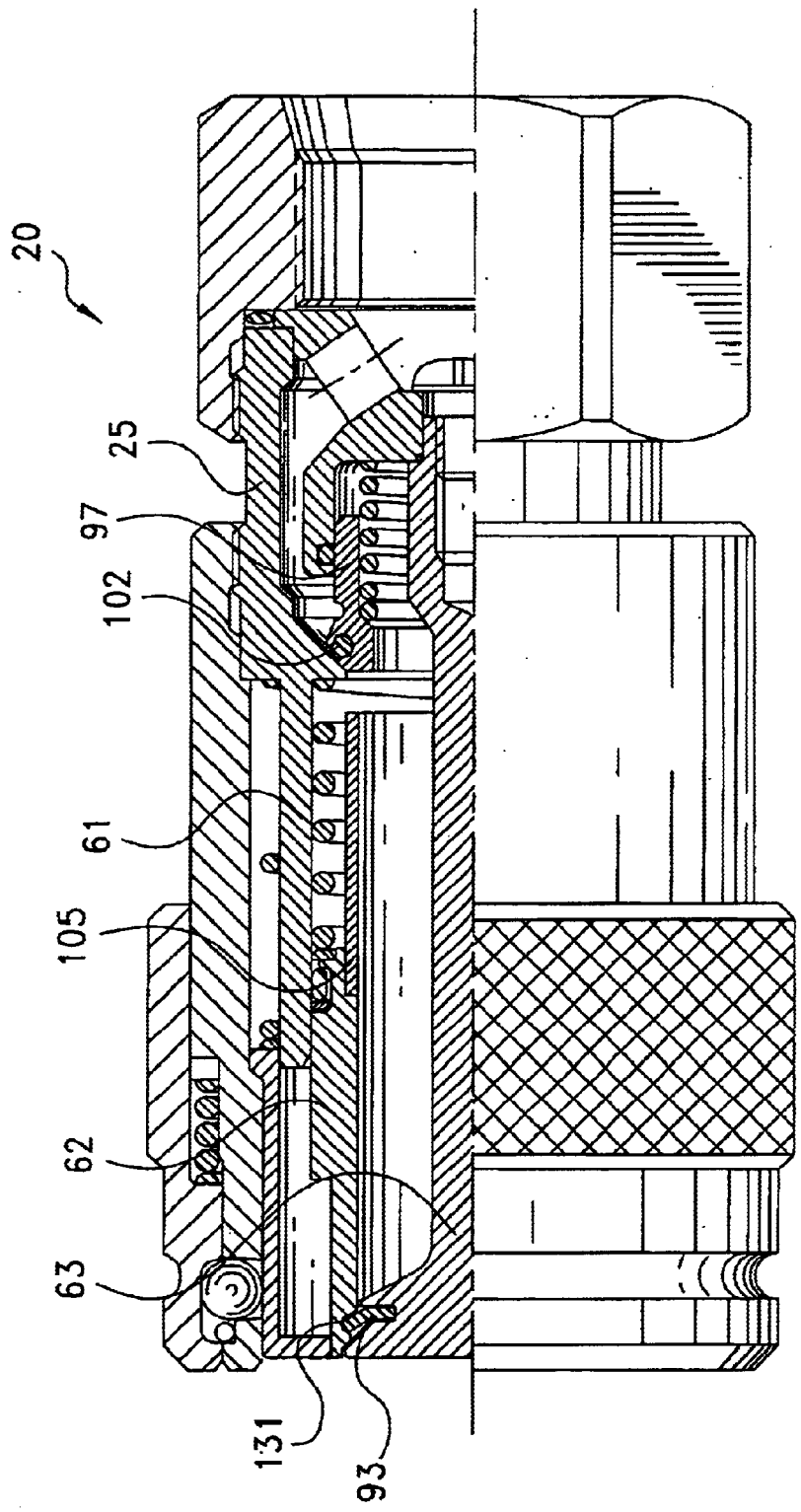
FIG. 5 is a side view, shown in partial cross-section, of a further embodiment of the female half of the coupling.

A tubular actuator 105 is closely received within the inner diameter of base 70 of retainer sleeve 61 and within an inner diameter of sealing sleeve 62. The actuator 105 can be formed unitary with the valve sleeve 97, or as illustrated in FIG. 1, can be formed as a separate piece, and connected thereto such as by welding, brazing or friction fit. Alternatively, as illustrated in FIG. 5, the actuator could be connected to the sealing sleeve 62, such as by threads or by being unitary therewith. In any event, the actuator is positioned to move the valve sleeve when the actuator moves axially within the coupling body. Actuator 105 has a series of flow holes or slots 106 toward its rear end, the reason for which will be described below.

The female coupling half 20 describe above is connected via a hose or tube to an appropriate application, e.g., to an implement for construction equipment. Again, as describe above, this is only one application for the coupling, and the coupling can be used in other applications. It should also be appreciated that, while the present invention is primarily directed to an application where the female coupling half is connected to an implement, the female coupling half could just as well be connected directly to the source of pressure, e.g., directly (via hose or tubing) to a piece of construction equipment or to a tractor.

Figure 2:
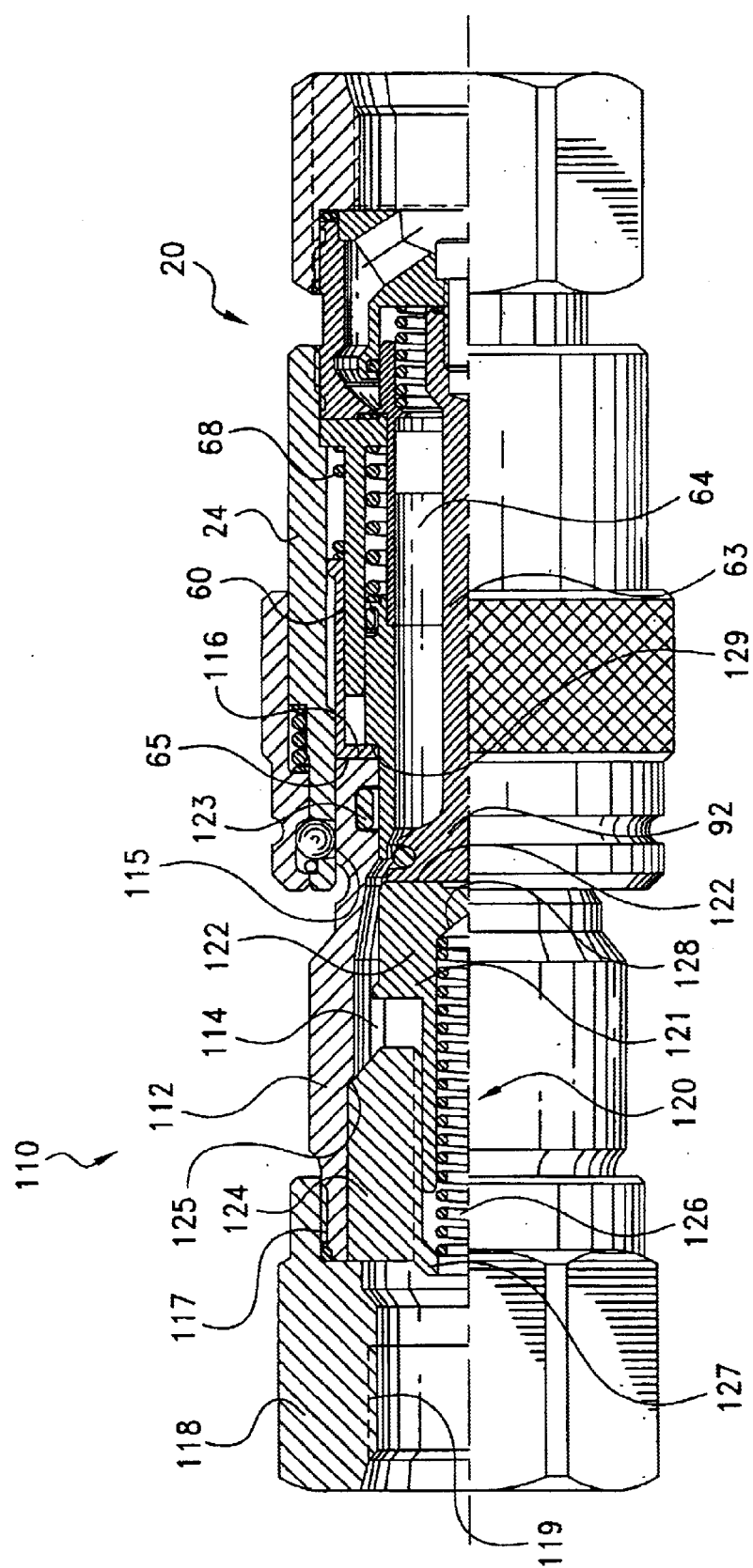
FIG. 2 is a side view of the entire coupling, shown in partial cross-section, with the male half at an initial stage of connection with the female half.

A male coupling half, indicated generally at 110 in FIG. 2, is received within the female coupling half 20. Male coupling half 110 includes a cylindrical plug 112 defining an inner fluid passage 114. Plug 112 includes an outwardly-facing, circumferentially-extending channel or groove 115 near its front end, and a flat annular front surface 116, which as illustrated, can be located flush against the flat annular front face 65 of face sleeve 60. The rear end of the plug is connected, such as by cooperating threads 117, to a fitting 118. An inner threaded portion, as at 119, is provided in fitting 118 to enable the male half to be connected to a hose or tube end, or other appropriate location in the fluid system. The fitting 118 preferably has an appropriate outer geometry (e.g., a hexagonal geometry) to enable the male half to be easily engaged using a conventional tool.

A valve assembly, indicated generally at 120, can be provided in the male half. Valve assembly 120 preferably includes a hollow poppet valve 121 with a flat front face 122, that is moveably disposed in plug 112 toward the forward end of the male half. A seal 123 is carried in an inwardly-facing groove formed in the plug 112, and seals against valve 121 to prevent fluid drainage from the male half when the male half is in the closed, disconnected condition. An annular guide 124 is fixed between fitting 116 and an inner tapered shoulder 125 in plug 112. A spring 126 is held between an inwardly tapered end 127 of guide 124 and an inner bore 128 of poppet valve 121, and biases poppet valve 121 forwardly in the plug 112, so that the forward surface 122 of poppet valve 121 is normally essential flush with surface 116 of plug 112 when the male half is fluidly closed. The male half is preferably conventional in nature, and will not be described further for sake of brevity.

As illustrated in FIG. 2, the male half 110 is shown inserted into the female half 20. The flat front face 116 of the male valve 112 engages flush against the flat front flange 65 of face sleeve 60, and forces the face sleeve 60 rearwardly within the body. At the same time, the valve head 92 of valve body 63 in female half 20 engages poppet valve 121 in the male half and moves the poppet valve 121 into an open position. The face sleeve 60 is urged by the male half against outer sleeve spring 68, and is pushed rearwardly until flange 65 of the face sleeve engages an outwardly-facing annular shoulder 129 on sealing sleeve 62 to also move sealing sleeve 62 rearwardly within the coupling. When the sealing sleeve moves rearwardly, it moves out of sealing engagement with valve body 63.

Figure 3:
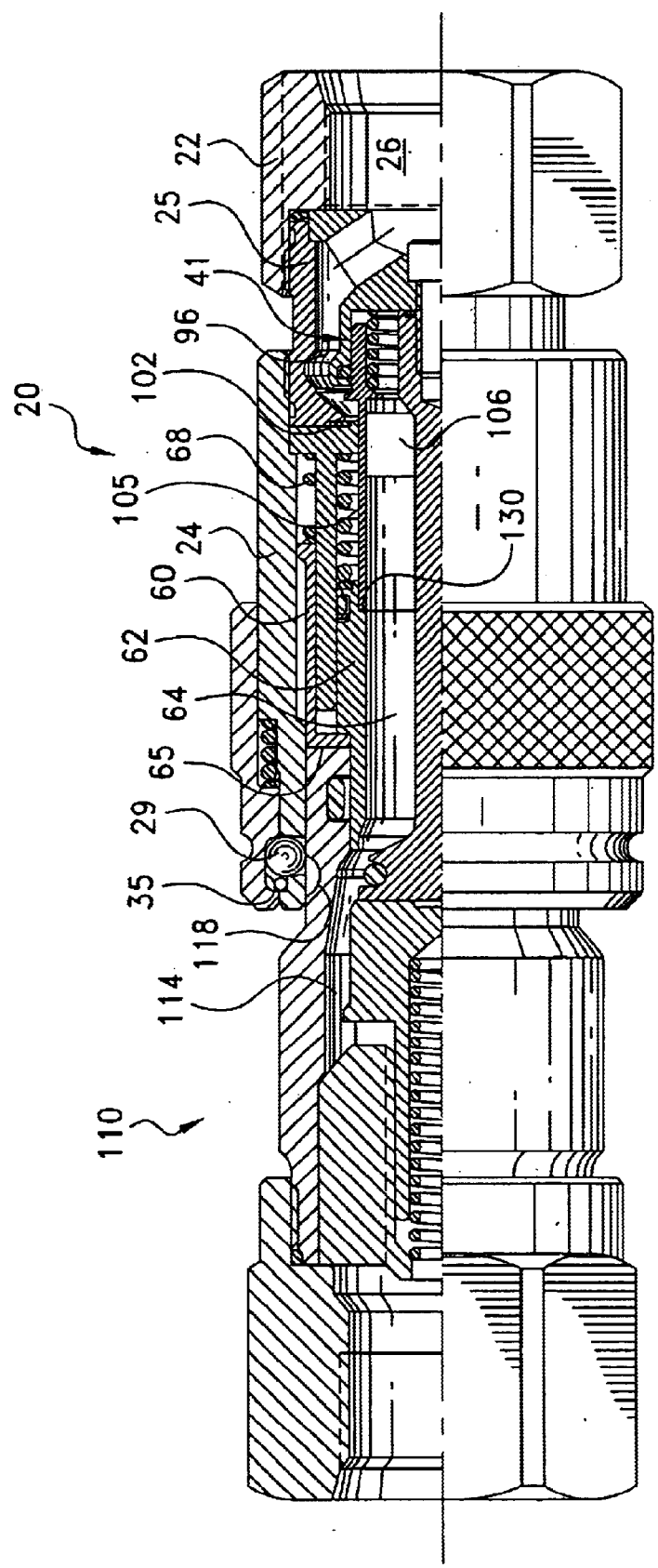
FIG. 3 is a view similar to FIG. 2, shown with the male half at a subsequent connection stage with the female half.

Upon further movement of the male half into the female half, as shown in FIG. 3, an inwardly-facing annular shoulder 130 (see also, FIG. 1) of sleeve 62 engages the forward end of actuator 105. This moves the actuator 105 rearwardly within the coupling body, and likewise moves the valve sleeve 97 rearwardly, away from front seal 102. As the valve sleeve moves rearwardly, openings 106 in actuator 105 become open to fluid flow through passage 96, and a flow path is thereby provided through the coupling, that is, from the fitting 22 (via passage 26), through the adapter 25 (via passage 96), through the coupling body 24 (via passage 64) to the passage 114 of the male half 110. As the secondary valve opens, the pressure upstream of the secondary valve is relieved to essentially zero pressure through the male half, which allows the male half to be fully and easily inserted into the female half. When the male half is fully inserted, the opening 106 provide maximum flow and preferably essentially no pressure drop across the secondary valve.

Figure 4:
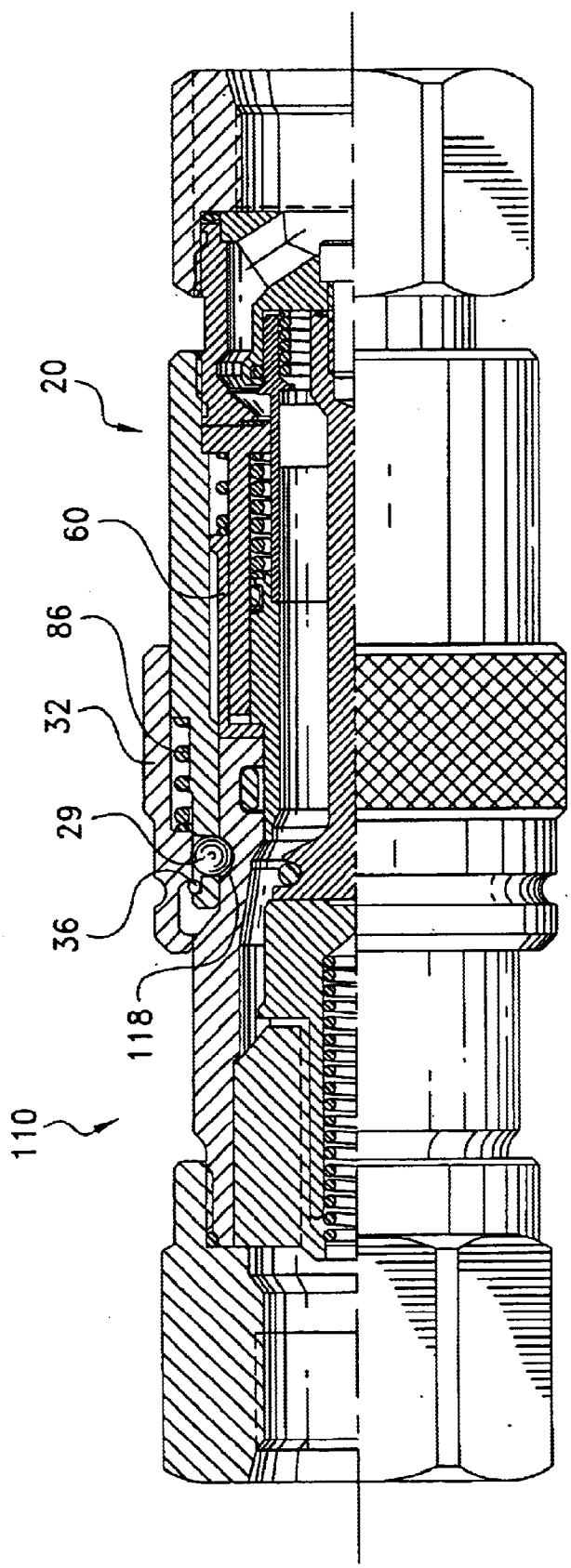
FIG. 4 is view similar to FIG. 3, shown with the male half fully connected with the female half.

Also when face sleeve 60 is urged rearwardly, the flange 65 of the face sleeve moves past the locking balls, which thereby allows balls 29 to be urged radially inward by the camming action of groove 35 of the locking collar 32, and into engagement with the locking groove 118 in the male half 110, as illustrated in FIG. 4. The locking collar 32 is retained over the balls by spring 86 to keep the balls engaged with the locking groove in the male half, and thereby fixedly retain the male half 110 within the female half 20. The coupling is thereby fully open with the male half coupled to the female half.

The male coupling half 110 can be disconnected from the female half 20 by manual manipulation of locking collar 32. Moving locking collar 32 axially rearward on coupling body 24 allows locking balls 29 to become aligned with groove 35 (FIG. 3), which thereby allows the balls to move radially outward into ball groove 35, and thereby allow the male half 110 to be removed from the female half 20. Outer sleeve spring 68 assists in moving the male coupling half outwardly from the female coupling half, and as the male coupling half is removed, valve sleeve 97 first seals against seal 102, and sealing sleeve 62 then seals against valve body 63, to close the flow path through the female half; while poppet valve 121 closes the flow path through the male half.

The secondary valve 41 generally maintains zero, or close to zero pressure downstream of the valve sleeve after the female coupling half is disconnected, so that it is relatively easy to connect (or reconnect) a male coupling half. However, in the event pressure builds up downstream of the secondary valve 41, such as because of fluid leaking past seals 102, 103, or otherwise (e.g., thermal expansion of trapped fluid during the heat of the day), the seal 93 carried by the valve body has a configuration which allows fluid to escape past the seal and vent to atmosphere. The stepped inner surface of sealing sleeve 62, and the teardrop-shape of seal 93, provides flexibility for the seal such that the seal will retain some fluid pressure within passage 64 to normally prevent leakage during connect and disconnect at lower fluid pressures—but will flex and relieve fluid to atmosphere at higher fluid pressures. The particular material and configuration of the seal can be easily determined and designed to select the particular pressure at which the seal relieves to atmosphere. For example, as shown in FIG. 5, the seal 93 can have a washer shape, and fit within a cooperating and appropriately-dimensioned groove 131 in the sealing sleeve 62, to achieve the same effect.

And also in FIG. 5, a further embodiment of the present invention is shown, where the adapter 25 and retainer sleeve 61 are formed unitarily (in one piece). The seal 102 could be carried in a groove formed in this combined component, similar to FIGS. 1–4, however, as illustrated in FIG. 5, it could likewise be carried within a groove formed at the forward end of the valve sleeve 97. But regardless of whether the front seal is carried on the valve sleeve or elsewhere in the coupler body, the valve sleeve seals within the coupler body when the female coupling half is disconnected to prevent fluid flow through passage 96.

Figure 6:
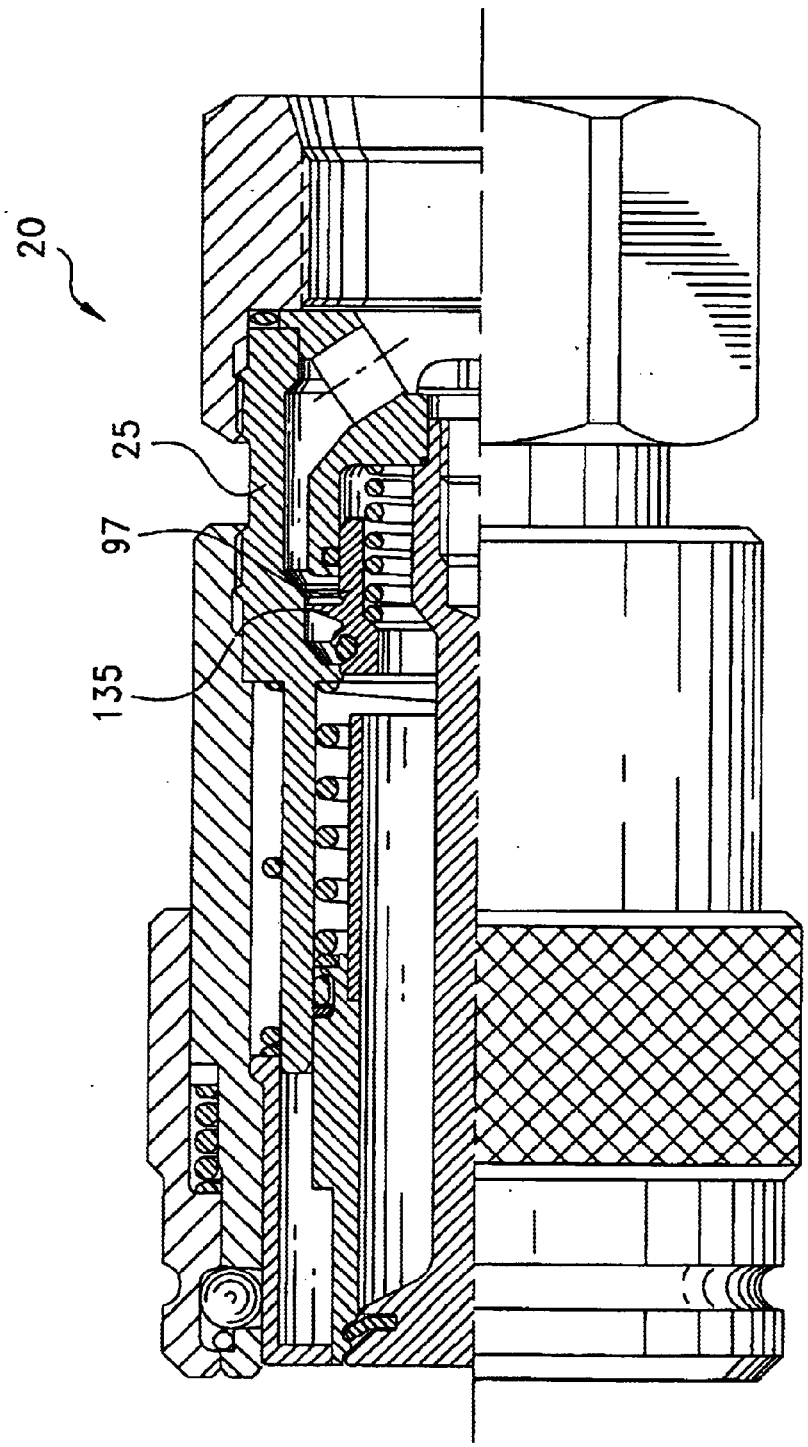
FIG. 6 is a side view, shown in partial cross-section, of a still further embodiment of the female half of the coupling.

Finally, as shown in FIG. 6, an annular, radially-outward projecting flange 135 is shown along the length of the valve sleeve to prevent sudden surges of fluid during the connection process. The flange 135 is preferably formed unitary with valve sleeve 97, and is closely received within a reduced-diameter portion 136 of adapter 25 when the secondary valve is in the closed position (i.e., when the female coupling half is disconnected from the male coupling half); moves axially through a tapered portion 137 as the male half is being connected; and moves axially into an enlarged diameter portion 138 when the secondary valve is fully opened (i.e., when the female coupling half is fully connected to the male coupling half). The tapered portion 137 creates an expanding annular orifice with the flange as the valve sleeve moves into the fully open position. Flange 135 prevents fluid flow through the passage 96 when the female half is disconnected and the flange is received in the reduced diameter portion, and prevents sudden surges of fluid through the secondary valve as the male half is being inserted. When the male half is fully connected, the flange moves into the enlarged portion 138 to maximize flow and minimize the pressure drop across the secondary valve. It is noted that the annular flange is only one example, and that other geometries could likewise be used with the valve sleeve (or surrounding adapter) to create an expanding orifice during connect.

Thus, as described above, a novel and unique push-to-connect coupling is provided, particularly for construction equipment, which allows easy connect of the male coupling half, even when the female half is under pressure; and which allows pressure to escape from the downstream end of the female half, should there be leakage in the secondary valve.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A coupling having a male half and a female half,
   the male half including a cylindrical plug with a front face, and a locking groove formed on an outer surface of the plug toward the front face; and
   the female half including i) a cylindrical coupling body and a fitting at a rear end of the coupling body, the fitting having a first internal flow passage, said coupling body having a series of locking ball openings toward the front end, ii) a locking collar axially moveable relative to the coupling body at a front end of the coupling body, the locking collar including a ball groove formed on an inner surface that can receive locking balls, iii) a collar spring urging the locking collar forwardly in the coupling body, iv) a series of locking balls received in the locking ball openings in the coupling body, the ball groove in the locking collar being normally axially aligned with the locking balls and the locking balls being received in the ball groove, v) a cylindrical face sleeve axially moveable relative to the coupling body received in the coupling body, said face sleeve having a front face engageable with the front face of the male half when the male half is inserted into the female half, vi) a sleeve spring urging the face sleeve forwardly in the coupling body, vii) a cylindrical retainer sleeve received in the face sleeve, the retainer sleeve being fixed relative to the coupling body, viii) a sealing sleeve axially moveable relative to the coupling body received in the retainer sleeve, ix) a valve body received in the sealing sleeve and also fixed relative to the coupling body, the coupling body having a second internal flow passage defined between the sealing sleeve and valve body, and x) a pressure-balanced valve sleeve moveable relative to the sealing sleeve normally in a forward, closed position preventing flow between the first and second flow passages, said valve sleeve moveable rearwardly into an open position allowing flow between the first and second flow passages, the valve sleeve having a front end normally in sealing engagement within the coupling body when the sleeve is in the closed position; the male half moving the face sleeve rearwardly in the coupling body when the male half is inserted into the female half, the face sleeve cooperating with the sealing sleeve and moving the sealing sleeve rearwardly in the coupling body and out of sealing engagement with the valve body when the male half is inserted into the female half, the sealing sleeve further cooperating with and moving the valve sleeve rearwardly in the coupling body into the open position to open a flow path between the first and second flow passages, and the locking balls, when the face sleeve is moved rearwardly, becoming axially aligned with the locking groove in the valving such that the locking balls can be urged radially inward by the locking collar into the locking groove in the valving to couple the male half to the female half.

2. The coupling as in claim 1, wherein the valve sleeve is supported and has a configuration such that the movement of the sleeve is not significantly effected by fluid pressure in the female half.

3. The coupling as in claim 2, wherein a first seal is provided between a forward end of the valve sleeve and the retainer sleeve and provides a seal between the retainer sleeve and the valve sleeve when the valve sleeve is in the closed position; and a second seal is provided along the length of the valve sleeve and provides a seal along the valve sleeve as the valve sleeve moves between the open and closed positions.

4. The coupling as in claim 3, further including a seal gland located internally of the coupling body, the valve sleeve closely received within a tubular extension of the seal gland, and the seal gland carrying the second seal against the length of the valve sleeve.

5. The coupling as in claim 1, wherein the male plug has an annular flat front face, and the face sleeve has a corresponding annular flat front face.

6. The coupling as in claim 1, further including a seal located between the sealing sleeve and the valve body, the seal preventing fluid leakage from the second flow passage when the female half is disconnected from the male half and the second flow passage is at a fluid pressure less than a predetermined pressure, and allowing fluid to vent to atmosphere from the second flow passage when the female half is disconnected and the fluid pressure in the second flow passage is greater than the predetermined pressure.

7. The coupling as in claim 1, further including an adapter interconnecting the coupling body and the fitting, the valve sleeve being located within the adapter.

8. The coupling as in claim 1, wherein a seal is provided between a forward end of the valve sleeve and the sealing sleeve to prevent fluid leakage when the valve sleeve is in the closed position, and a geometry is provided upstream from the seal, that i) prevents fluid flow when the valve sleeve is in the closed position, ii) provides an increasing orifice as the valve sleeve is moved from the closed position to an open position to prevent surges of fluid through the coupling as the male half is being connected with the female half, and iii) maximizes flow and minimizes pressure drop when the male half is fully connected with the female half.

9. The coupling as in claim 8, wherein the geometry is integral with the valve sleeve.

10. The coupling as in claim 9, wherein the geometry includes an annular flange on the valve sleeve positioned along the length of the sleeve, and the female half includes a reduced diameter portion, an enlarged diameter portion, and a tapered portion interconnecting the reduced diameter portion and the enlarged portion; wherein the annular flange is i) closely received in the reduced diameter portion of the female half when the valve sleeve is in the closed position; ii) located in the tapered portion when the male half is being connected; and iii) located in the enlarged diameter portion of female half when the male half is fully connected.

11. The coupling as in claim 1, further including a tubular actuator received within the sealing sleeve and moveable by the sealing sleeve to move the secondary valve.

12. The coupling as in claim 11, wherein the tubular actuator is integral with the secondary valve.

13. The coupling as in claim 1, and further including xi) an inner sleeve spring urging the sealing sleeve forwardly in the coupling body; and xii) a separate valve sleeve spring urging the valve sleeve forwardly in the coupling body.

14. The coupling as in claim 1, wherein the sealing sleeve and valve sleeve have cooperating structure which enables the sealing sleeve to i) move a predetermined distance rearwardly within the coupling body before contacting the valve sleeve, and ii) thereafter contact the valve sleeve to move the valve sleeve rearwardly into the open position.

15. The coupling as in claim 1, wherein the valve sleeve is normally in a forward, closed position with a forward distal end in sealing engagement with the coupling body, and moves rearwardly into the open position such that the distal end moves away from and out of sealing engagement with the coupling body.

16. A push-to-connect, flush-face coupling having a male half and a female half,
   the male half including a cylindrical plug with a front face, and a locking groove formed on an outer surface of the plug toward the front face; and
   the female half including i) a cylindrical coupling body and ii) a fitting at a rear end of the coupling body, the fitting having a first internal flow passage; said coupling body having a) a locking mechanism at a forward end of the coupling body for coupling the female half to the male half when the plug of the male half is inserted into the female half; and b) a valve assembly, the valve assembly including an upstream secondary valve and a downstream primary valve, with a second internal flow passage defined in the primary valve, the secondary valve comprising a pressure-balanced valve normally in a closed position in sealing engagement with the coupling body preventing flow between the first and second flow passages, and moveable into an open position out of sealing engagement with the coupling body allowing fluid flow between the first and second flow passages, the secondary valve being supported and having a configuration such that the movement of the secondary valve is not significantly effected by fluid pressure applied against the secondary valve.

17. The push-to-connect, flush-face coupling as in claim 16, wherein the secondary valve comprises a valve sleeve, and a first seal is provided between a forward end of the valve sleeve and the coupling body and provides a seal when the secondary valve is in the closed position; and a second seal is provided along the length of the valve sleeve to prevent fluid bypass of the sleeve when the valve sleeve moves between the open and closed positions.

18. The push-to-connect, flush-face coupling as in claim 17, further including a seal gland located internally of the coupling body, the valve sleeve closely received within a tubular extension of the seal gland, and the seal gland carrying the second seal against the length of the valve sleeve.

19. The push-to-connect, flush-face coupling as in claim 16, further including a seal located within the primary valve and normally preventing fluid leakage from the second flow passage when the female half is disconnected from the male half and the second flow passage is at a fluid pressure less than a predetermined pressure, and allowing fluid to vent from the second flow passage when the female half is disconnected and the fluid pressure in the second flow passage is greater than the predetermined pressure.

20. The push-to-connect, flush-face coupling as in claim 16, further including an adapter interconnecting the coupling body and the fitting, the pressure-balanced valve being located within the adapter.

21. The push-to-connect, flush-face coupling as in claim 16, wherein a seal is provided between the pressure-balanced valve and the coupling body to prevent fluid leakage when the pressure-balanced valve is in the closed position, and a geometry is provided upstream from the seal, that i) prevents fluid flow when the pressure-balanced valve is in the closed position, ii) provides an increasing orifice as the pressure-balanced valve is moved from the closed position to an open position to prevent surges of fluid through the coupling as the male half is being connected with the female half, and iii) maximizes flow and minimizes pressure drop when the male half is fully connected with the female half.

22. The push-to-connect, flush-face coupling as in claim 21, wherein the geometry is integral with the pressure-balanced valve.

23. The push-to-connect, flush-face coupling as in claim 22, wherein the geometry includes an annular flange on the pressure-balanced valve positioned along the length of the pressure-balanced valve, and the female half includes a reduced diameter portion, an enlarged diameter portion, and a tapered portion interconnecting the reduced diameter portion and the enlarged portion; wherein the annular flange is i) closely received in the reduced diameter portion of the female half when the pressure-balanced valve is in the closed position; ii) located in the tapered portion when the male half is being connected; and iii) located in the enlarged diameter portion of female half when the male half is fully connected.

24. The push-to-connect flush-face coupling as in claim 16, further including a tubular actuator received within the sealing sleeve and moveable by the sealing sleeve to move the secondary valve.

25. The push-to-connect flush-face coupling as in claim 24, wherein the tubular actuator is integral with the secondary valve.

26. A female coupling half for a push-to-connect, flush-face coupling, the female coupling half comprising:
   a coupling body, a first internal flow passage at an upstream end of the coupling body and a second internal flow passage at a downstream end of the coupling body, a locking mechanism in the downstream end of the coupling body for coupling the female coupling half to a male half when the male half is inserted into the coupling body; and a valve assembly, the valve assembly including an upstream secondary valve and a downstream primary valve, the secondary valve comprising a pressure-balanced valve normally in a closed position in sealing engagement with the coupling body preventing fluid flow between the first and second flow passages, and moveable into an open position out of sealing engagement with the coupling body allowing fluid flow between the first and second flow passages, the secondary valve being supported and having a configuration such that the movement of the secondary valve is not significantly effected by fluid pressure applied against the secondary valve.

27. The female coupling half as in claim 26, wherein the secondary valve comprises a valve sleeve, and a first seal is provided between a forward end of the valve sleeve and the coupling body and provides a seal when the secondary valve is in the closed position; and a second seal is provided along the length of the valve sleeve to prevent fluid bypass of the sleeve when the valve sleeve moves between the open and closed positions.

28. The female coupling half as in claim 27, further including a seal gland located internally of the coupling body, the valve sleeve closely received within a tubular extension of the seal gland, and the seal gland carrying the second seal against the length of the valve sleeve.

29. The female coupling half as in claim 26, further including a seal located within the primary valve and normally preventing fluid leakage from the second flow passage when the female half is disconnected from the male half and the second flow passage is at a fluid pressure less than a predetermined pressure, and allowing fluid to vent from the second flow passage when the female half is disconnected and the fluid pressure in the second flow passage is greater than the predetermined pressure.

30. The female coupling half as in claim 26, wherein a seal is provided between the pressure-balanced valve and the coupling body to prevent fluid leakage when the pressure-balanced valve is in the closed position, and a geometry is provided upstream from the seal, that i) prevents fluid flow when the pressure-balanced valve is in the closed position, ii) provides an increasing orifice as the pressure-balanced valve is moved from the closed position to an open position to prevent surges of fluid through the coupling as the male half is being connected with the female half, and iii) maximizes flow and minimizes pressure drop when the male half is fully connected with the female half.

31. The female coupling half as in claim 27, wherein the geometry is integral with the pressure-balanced valve.

32. The female coupling half as in claim 31, wherein the geometry includes an annular flange on the pressure-balanced valve positioned along the length of the pressure-balanced valve, and the female half includes a reduced diameter portion, an enlarged diameter portion, and a tapered portion interconnecting the reduced diameter portion and the enlarged portion; wherein the annular flange is closely received in the reduced diameter portion of the female half when the pressure-balanced valve is in the closed position; is located in the tapered portion when the male half is being connected; and is located in the enlarged diameter portion of female half when the male half is fully connected.

33. A female coupling half as in claim 26, wherein:
the coupling body includes a series of locking ball openings toward the upstream end, i) a locking collar axially moveable relative to the coupling body at the upstream end of the coupling body, the locking collar including a ball groove formed on an inner surface that can receive locking balls, ii) a collar spring urging the locking collar forwardly in the coupling body, iii) a series of locking balls received in the locking ball openings in the coupling body, the ball groove in the locking collar being normally axially aligned with the locking balls and the locking balls being received in the ball groove, iv) a cylindrical face sleeve axially moveable relative to the coupling body received in the coupling body, said face sleeve having a front face engageable with a front face of the male half when the male half is inserted into the female half, v) a sleeve spring urging the face sleeve forwardly in the coupling body, vi) a cylindrical retainer sleeve received in the face sleeve, the retainer sleeve being fixed relative to the coupling body, vii) a sealing sleeve axially moveable relative to the pressure balanced valve and to the coupling body received in the retainer sleeve, viii) a valve body received in the sealing sleeve and also fixed relative to the coupling body, the second internal flow passage defined between the sealing sleeve and valve body, the face sleeve moveable rearwardly in the coupling body and cooperating with the sealing sleeve and moving the sealing sleeve rearwardly in the coupling body and out of sealing engagement with the valve body, the sealing sleeve further cooperating with and moving the pressure balanced valve rearwardly in the coupling body to open a flow path between the first and second flow passages, and the locking balls, when the face sleeve is moved rearwardly, moveable radially inward by the locking collar.

34. The female coupling half as in claim 33, further including a tubular actuator received within the sealing sleeve and moveable by the sealing sleeve to move the secondary valve.

35. The female coupling half as in claim 34, wherein the tubular actuator is integral with the secondary valve.

36. The coupling as in claim 33, and further including xi) an inner sleeve spring urging the sealing sleeve forwardly in the coupling body; and xii) a separate valve spring urging the pressure balanced valve forwardly in the coupling body.

37. The coupling as in claim 33, wherein the sealing sleeve and pressure balanced valve have cooperating structure which enables the sealing sleeve to i) move a predetermined distance rearwardly within the coupling body before contacting the pressure balanced valve, and ii) thereafter contact the pressure balanced valve to move the pressure balanced valve rearwardly into the open position.

38. The coupling as in claim 33, wherein the pressure balanced valve is normally in a forward, closed position with a forward distal end in sealing engagement with the coupling body, and moves rearwardly into the open position such that the distal end moves away from and out of sealing engagement with the coupling body.

* * * * *